Feb. 27, 1940.  J. R. SCHRAMM  2,191,808
TREE MARKER
Filed Dec. 9, 1939
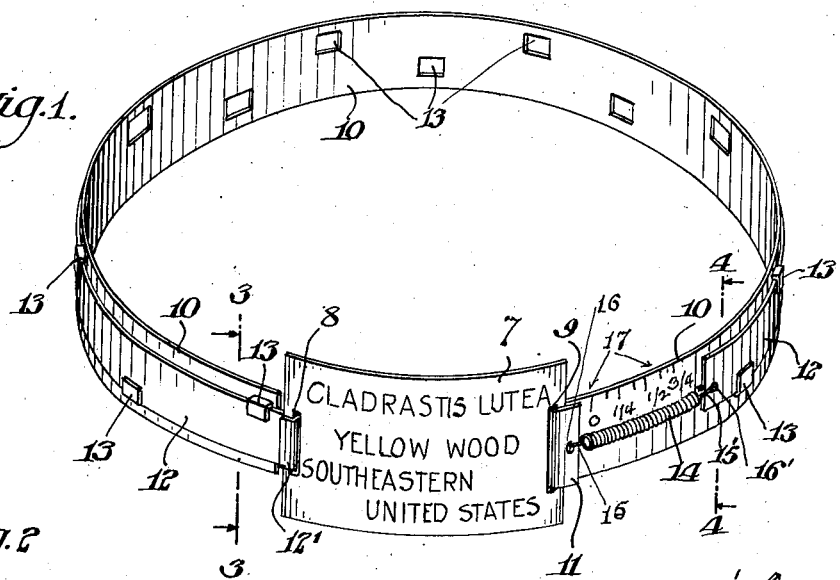
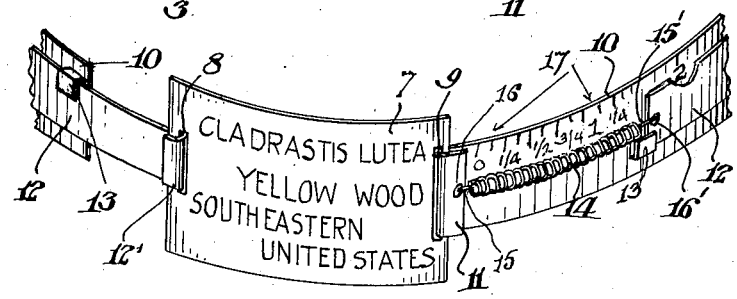
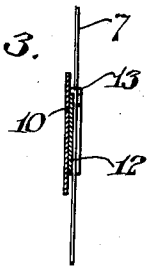 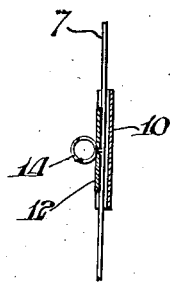
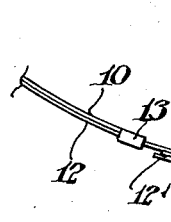
INVENTOR:
Jacob R. Schramm
BY
ATTORNEY.

Patented Feb. 27, 1940

2,191,808

UNITED STATES PATENT OFFICE 2,191,808

TREE MARKER

Jacob R. Schramm, Philadelphia, Pa.

Application December 9, 1939, Serial No. 308,365

3 Claims. (Cl. 40—21)

The invention relates to improvements in tree markers; the object being to provide a convenient and substantial device for marking the tree with its name or description, or both, and also with its habitat.

The invention comprises a plate preferably of weather-resisting material such as stainless steel, aluminum or other non-oxidizing material. This plate is marked or lettered in any suitable or convenient way to indicate the characteristics above referred to. In the present example the marking is done by embossment of the letters upon the face of the plate. Obviously other methods of providing the inscription may be used.

In the present example the plate is slightly curved to conform to the part of the tree to which it is to be attached.

A self-adjusting composite supporting band is attached to the plate to hold the same in position upon the tree with proper fit and elastic tension, and to permit circumferential growth of that part of the tree, to which the band is secured, without injury to the tree.

A special feature of the invention is improved means or method whereby is provided a flexible composite band which is arbitrarily formed to approximate the circumferential dimensions of the tree at the point to which it is attached. Another feature is the provision therewith of resilient means for contracting the composite band to encircle the tree with a close fit and under constant tension. Another feature is the provision of means not only normally to secure the plate to the tree with the fit under tension, but also to provide means adapted automatically to expand as the tree grows, so as to hold the plate in place under substantially constant tension and without injury to the tree.

Another feature is the provision of a scale or graduations marked on one band to indicate the extent of relative movement of one band with respect to the other band.

Referring to the drawing which illustrates merely by way of example a preferred embodiment of my invention:

Fig. 1 is a view in perspective of the device embodying my invention.

Fig. 2 is a fragmentary perspective view showing the elements in different relative positions.

Fig. 3 is a section on line 3—3 of Fig. 1.

Fig. 4 is a section on line 4—4 of Fig. 1.

Fig. 5 is a fragmentary plan view of the device as shown in Fig. 1.

Similar numerals refer to similar parts throughout the several views.

In accordance with the device as illustrated in the drawing, the plate 7 is provided with the slots 8 and 9, near and parallel to the side margins of the plate. A relatively wide band 10, for encircling the tree trunk, is disengageably secured at one end in one slot, as at 9, by means of a hook formation 11, while the other end of band 10 is not connected to the plate.

A relatively narrow band 12 is secured to the other side of plate 7, as in slot 8, and is adapted to lie upon the wider band and is relatively slidable with respect to said band 10, between the oppositely disposed guide tongues or lugs 13.

The other end of the narrow band 12 is connected to a tension spring 14. This spring is disengageably connected at one end, to the overturned or hook formation 11, by means of a hook 15 secured in the hole 16 of formation 11, while the other end of the spring is connected in a similar way by means of the hook 15' and hole 16', to end of band 12.

By this arrangement it will be seen that one end of each band is fixedly secured to the plate, while the opposite ends of said bands are free to slide one upon the other, under control of the tension of spring 14, so that the composite band will embrace the tree trunk under said spring tension.

The scale or graduations 17, provided along the margin of band 10, serve to indicate the amount of movement of the free end of band 12 relatively to band 10. This movement is caused by the circumferential increment due to the growth of the tree, after the plate has been attached thereto.

As shown in Figs. 1 and 2, this scale is marked in inches and fractions thereof, beginning at zero. In actual practice these band strips are made in 5-foot lengths and marked with graduations from end to end. Parts are severed from this 5-foot strip in lengths approximately to fit the trees to which the markers are to be attached. As a result the scale numbering of each section will not always begin at zero.

In which case, it is only necessary to note the indication on the scale, which corresponds in position with the free end of the narrow band 12, at the time the plate is attached, and by making similar notes at the ends of fixed periods thereafter, the circumferential increment for a given period is readily ascertained.

In operation the two band elements are provided of such lengths, and so positioned relatively as to, in their composite arrangement, embrace the tree, or part thereof to which the device is to be fitted. The composite band elements are adapted to have such relative movement, under spring tension, so as to expand or contract to secure a sufficiently tight fit to hold the device in place, and also to have sufficient freedom of expansion under tension to permit the growth of the tree without injury thereto.

The use of the scale or graduation for indicating the relative movement of the free end of band 12 becomes quite important when the markers are used in tree plots, in which growth (circumferential increment) studies are being made.

What I claim is:—

1. A tree marker comprising a plate provided with appropriate indicia, and a composite band support therefor comprising two flexible band elements, one slidable upon the other, one end of one band element secured to the plate near one of its side margins, one end of the other band element secured to the plate near its other side margin, and resilient means, effective between the free end of one band element and the adjacent side margin of the plate, tending to contract the total circumference of the composite band.

2. A tree marker comprising a plate provided with appropriate indicia, and a composite band support therefor comprising two flexible band elements, one slidable upon the other, one end of one band element secured to the plate near one of its side margins, one end of the other band element secured to the plate near its other side margin, and resilient means, effective between the free end of one band element and the adjacent side margin of the plate, tending to contract the total circumference of the composite band, one of said band elements provided with graduation marks along its longitudinal margins for indicating the extent of the relative movements of said band elements.

3. A tree marker comprising a plate provided with appropriate indicia, and a composite band support therefor comprising two flexible band elements, one slidable upon the other, one end of one band element secured to the plate near one of its side margins, one end of the other band element secured to the plate near its other side margin, and resilient means, effective between the free end of one band element and the adjacent side margin of the plate, tending to contract the total circumference of the composite band, one band element provided with flanking formations for guiding the longitudinal movement thereon of the other band element.

JACOB R. SCHRAMM.